United States Patent [19]

Kawabe et al.

[11] 4,172,287
[45] Oct. 23, 1979

[54] GENERAL PURPOSE DATA PROCESSING APPARATUS FOR PROCESSING VECTOR INSTRUCTIONS

[75] Inventors: Shun Kawabe; Chikahiko Izumi, both of Hadano; Toshihiko Odaka, Sagamihara, all of Japan

[73] Assignee: Hitachi, Ltd., Japan

[21] Appl. No.: 865,485

[22] Filed: Dec. 29, 1977

[30] Foreign Application Priority Data

Jan. 12, 1977 [JP] Japan .................................. 52-1523

[51] Int. Cl.² .......................... G06F 7/38; G06F 9/00
[52] U.S. Cl. ...................................... 364/736; 364/200
[58] Field of Search .................. 364/736, 715, 200

[56] References Cited

U.S. PATENT DOCUMENTS

| | | | |
|---|---|---|---|
| 3,440,611 | 4/1969 | Falkoff et al. | 364/200 |
| 3,794,984 | 2/1974 | Deerfield et al. | 364/200 |
| 3,900,723 | 8/1975 | Bethany et al. | 364/736 |
| 3,979,728 | 9/1976 | Reddaway | 364/200 |

*Primary Examiner*—David H. Malzahn
*Attorney, Agent, or Firm*—Craig and Antonelli

[57] ABSTRACT

A general purpose data processing apparatus is provided which is adapted also for processing vector instructions. An instruction control unit reads instructions out of a memory and decodes them. If the instructions are different from vector instructions, an arithmetic unit performs the instructed operations. If the instructions are vector instructions, the subsequent control is performed by a vector instruction control unit. The vector instruction control unit decodes the vector instructions and controls the vector operands to cause the same arithmetic unit to perform the vector operation in accordance with the vector operands. Thus, the general purpose data processing apparatus can process vector instructions at high speed.

13 Claims, 4 Drawing Figures

GENERAL PURPOSE DATA PROCESSING APPARATUS FOR PROCESSING VECTOR INSTRUCTIONS

BACKGROUND OF THE INVENTION

This invention relates to a data processing apparatus and more particularly to such an apparatus adapted also for processing vector instructions in which vectors representing the locations of data are used as operands.

In the case where a general purpose data processing apparatus processes such vector instructions as representing the locations of data, it is usually difficult to process the vector instructions at high speed. Conventionally, there has been used a processor for exclusively processing vector instructions. However, there is today a demand for a general purpose data processing apparatus adapted also for processing vector instructions at satisfactorily high speed.

The use of a processor for exclusively processing vector instructions is disclosed in U.S. Pat. No. 3,541,516 to D. N. Senzig entitled "Vector Arithmetic Multiprocessor Computing System", Japanese Patent Laid-Open Application No. 1411/72 entitled "High-speed Fourier Transform Data Processing Apparatus" (corresponding to U.S. application Ser. No. 52,332 filed on July 6, 1970 now abandoned), and Japanese Patent Publication No. 23704/77 entitled "Program Stored Computer Having Memory Buffer Device" (corresponding to U.S. application Ser. No. 177,564 filed on Sept. 2, 1971 now abandoned).

SUMMARY OF THE INVENTION

A main object of this invention is to provide a general purpose data processing apparatus capable of processing vector instructions at high speed.

Another object of this invention is to process vector instructions at high speed by detecting in accordance with the increment value of address whether the operands in question are the vectors to be continuously used or not, and increasing the speed of access to the operands of vector instructions in such a manner that a vector buffer for exclusive use is caused to take in the operands when they are continuously used and a buffer memory is caused to read the operands when they are discontinuously used.

To that end, a main feature of this invention lies in the provision of a vector instruction control means for decoding vector instructions and for controlling vector operands, in addition to a memory means, an instruction control means and an arithmetic means which are included in an ordinary general purpose data processing apparatus. In this invention, the memory means stores instruction words and operands and the instruction control means reads the instruction words out of the memory means and decodes them. The instruction control means causes the arithmetic means to perform an operation in accordance with the decoded instruction if the decoded instruction is different from a vector instruction. On the other hand, if the decoded instruction is a vector instruction, the subsequent control is performed by the vector instruction control means. The vector instruction control means decodes the vector instructions and controls the vector operands to cause the arithmetic means to perform vector operations. Thus, although the arithmetic means is controlled by different means in dependence on whether the decoded instruction is a vector instruction or not, the arithmetic means is used to process the instruction irrespectively of whether it is a vector instruction or not.

Another feature of this invention lies in the provision of a register for storing the addresses of the vector operands of a vector instruction and the increment values of the operands. In accordance with the increment values is detected whether the operands are continuous or not. If the operands are continuous, the vector buffer register is so controlled as to previously take in the operands, whereby vector instructions can be processed at high speed.

Although the above mentioned Japanese Patent Laid-Open Application No. 1411/72 and Japanese Patent Publication No. 23704 also disclose the provision of an operand buffer, the operand buffer is different in use and in stored contents from the vector buffer according to this invention. Namely, the operand buffer in the prior art stores all the operands to be successively processed as vector operands irrespectively of whether the operands are continuous or not.

DESCRIPTION OF PREFERRED EMBODIMENTS

Figure 1:
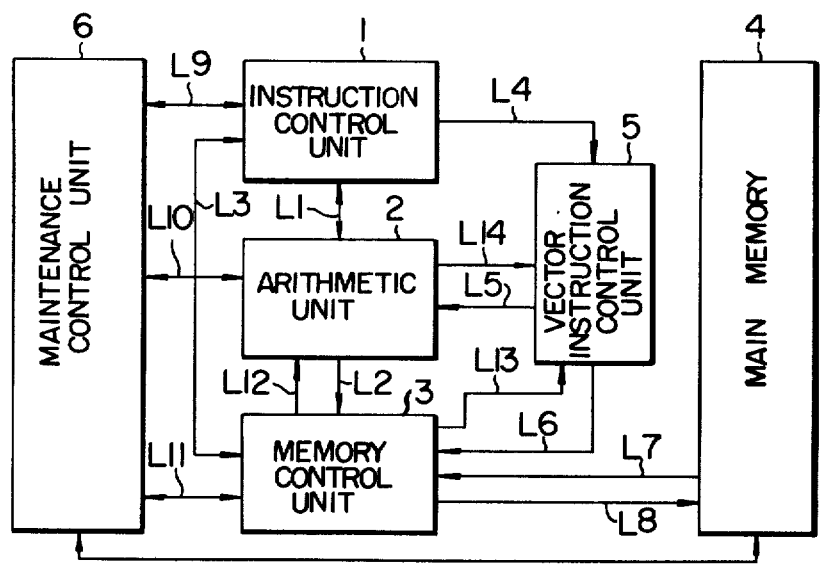
FIG. 1 is a block diagram of a data processing apparatus as an embodiment of this invention.

In FIG. 1 showing in block diagram an exemplary structure of a data processing apparatus according to an embodiment of this invention, reference numerals 1, 2, 3, 4, 5 and 6 designate an instruction control unit, an arithmetic unit, a memory control unit, a main memory, a vector instruction control unit and a maintenance control unit respectively. The flow for the processing of ordinary instruction words other than a vector instruction will first be described briefly. Instruction words are stored in the main memory 4 and the instruction control unit 1 takes in the instruction words through the memory control unit 3. Thereafter, the instruction control unit 1 decodes the instruction words and calculates the corresponding operand addresses and then the arithmetic unit 2 reads the operands and performs operations according to the decoded instructions. The operands are read out through the memory control unit 3.

This invention is especially effective for the processing of the vector instructions whose operand addresses occupy the large area in the main memory 4. The vector instruction words are taken in and decoded by the instruction control unit 1 in the same way as the processing of the ordinary instruction words. If an instruction is decoded and identified as a vector instruction, the following control according to the vector instruction is performed by the vector instruction control unit 5 which is unique in this invention.

Figure 2:
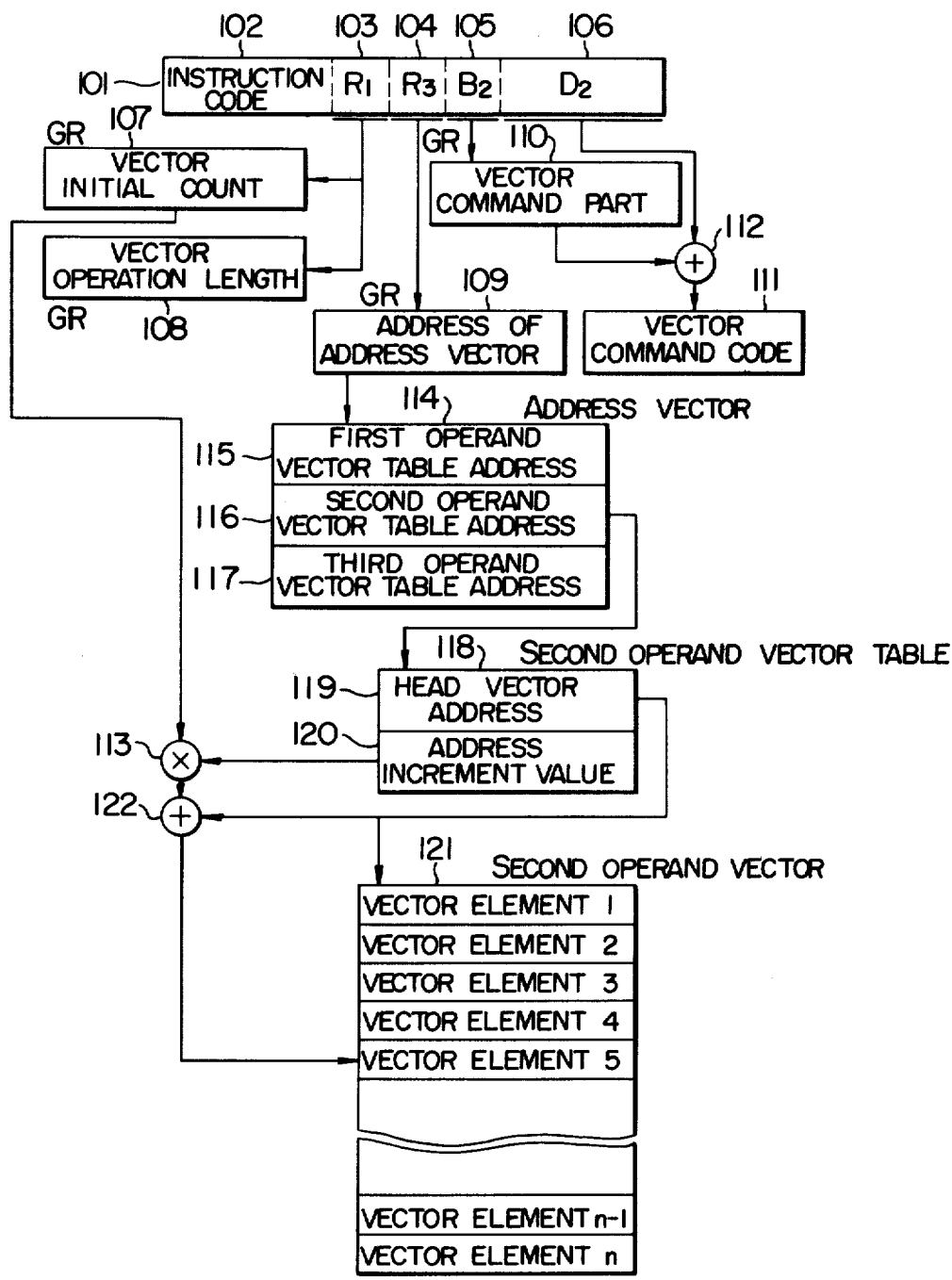
FIG. 2 shows in block diagram the interrelations among a vector instruction format, various registers and operands used in the embodiment shown in FIG. 1.

FIG. 2 shows the format of a vector instruction 101. An instruction code 102, irrespective of whether it is a vector or an ordinary instruction, has a specific code (i.e. B4 in this embodiment). A count specifying general purpose register number R1 denotes the number of a general purpose register GR and the content of the general purpose register represented by R1 indicates the initial count 107 of the vector while the content of the general purpose register represented by R1+1 indicates the operation length 108 of the vector. A vector command specifying general purpose register number B2 also denotes a general purpose register number and a vector command part 110 of the content of the general purpose register is added with a vector command data part through an adding operation 112 to produce a vector command code 111. The vector command code 111 serves as one of various codes for vectorical operations, for example, addition, subtraction, multiplication, division, inner product, etc. An address vector specifying general purpose register number R3, denotes a general purpose register number and the address of an address vector 114 is specified by the address 109 of the address vector of the content of the general purpose register. In the present embodiment, the address vector 114 includes three operand vector table addresses, i.e. a first operand vector table address 115, a second operand vector table address 116 and a third operand vector table address 117. They represent the addresses of the vector tables of the individual operands respectively. In FIG. 2, the second operand is depicted in detail, but it should be understood that the first and third operands have the same form. The second operand vector table 118 is specified by the address represented by the second operand vector table address 116. The second operand vector table 118 includes a head vector address 119 and an address increment value 120. The head vector address 119 denotes the head address of the second operand vector 121 and the address increment value 120 represents a pitch by which the second operand vector is used. For example, provided that one word is constituted of four bytes and that every address is in the form of a byte address, then the second operand vector is used with a pitch of one word or two words according as the second operand address increment value 120 is equal to 4 or 8.

The second operand vector of the vector instruction in question is not always used from its leading portion and the respective vectors may not be used continuously. The vector element address which is initially used in the second operand vector 121 is one obtained by adding through the operation 122 the second operand head vector address 119 to the value produced by the multiplication of the vector initial count 107 with the second operand address increment value 120 through multiplying operation 113. In the example of FIG. 2, the second operand vector 121 is shown as including vector elements 1 to n and it is shown that the vector element 5 is to be initially used.

Figure 3:
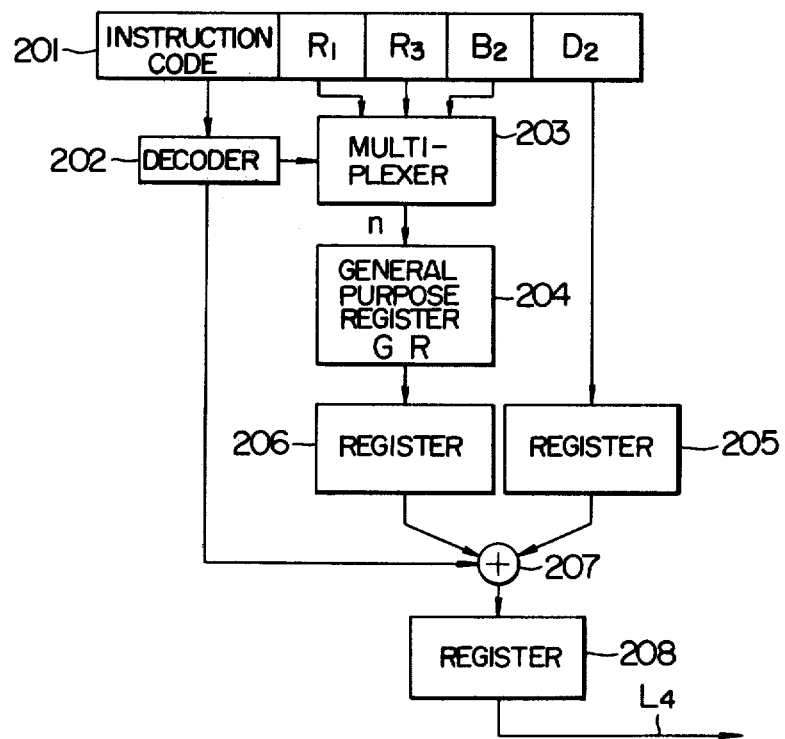
FIG. 3 shows in block diagram a part of the instruction control unit of FIG. 1 decoding instruction words.

FIG. 3 shows how a vector instruction is decoded by the instruction control unit 1. When an instruction word is registered into an instruction register 201, the decoding of the instruction is initiated. If the decoded instruction is identified as a vector instruction by a decoder 202, the general purpose register number B2 is first sent through a multiplexer 203 to a general purpose register 204. As a result, the vector command part as the content of the general purpose register 204 is read out and set in a register 206. The value D2 is directly set in a register 205 and then added to the content of the register 206 in an adder 207. The result of the addition is set as a vector command code in a register 208 and further sent through a line L4 to a vector instruction control unit 5. Next, the general purpose register number R3 is sent through the multiplexer 203 to the general purpose register 204 so that the content of the general purpose register 204 is read out. The delivered content is set as the address of an address vector in the register 206, then set in the register 208 and further sent through the line L4 to the vector instruction unit 5. Finally, the contents R1 and R1+1 of the general purpose register are set respectively as a vector initial count and a vector operation length in the register 206 and sent through the register 208 and the line L4 to the vector instruction control unit 5.

Figure 4:
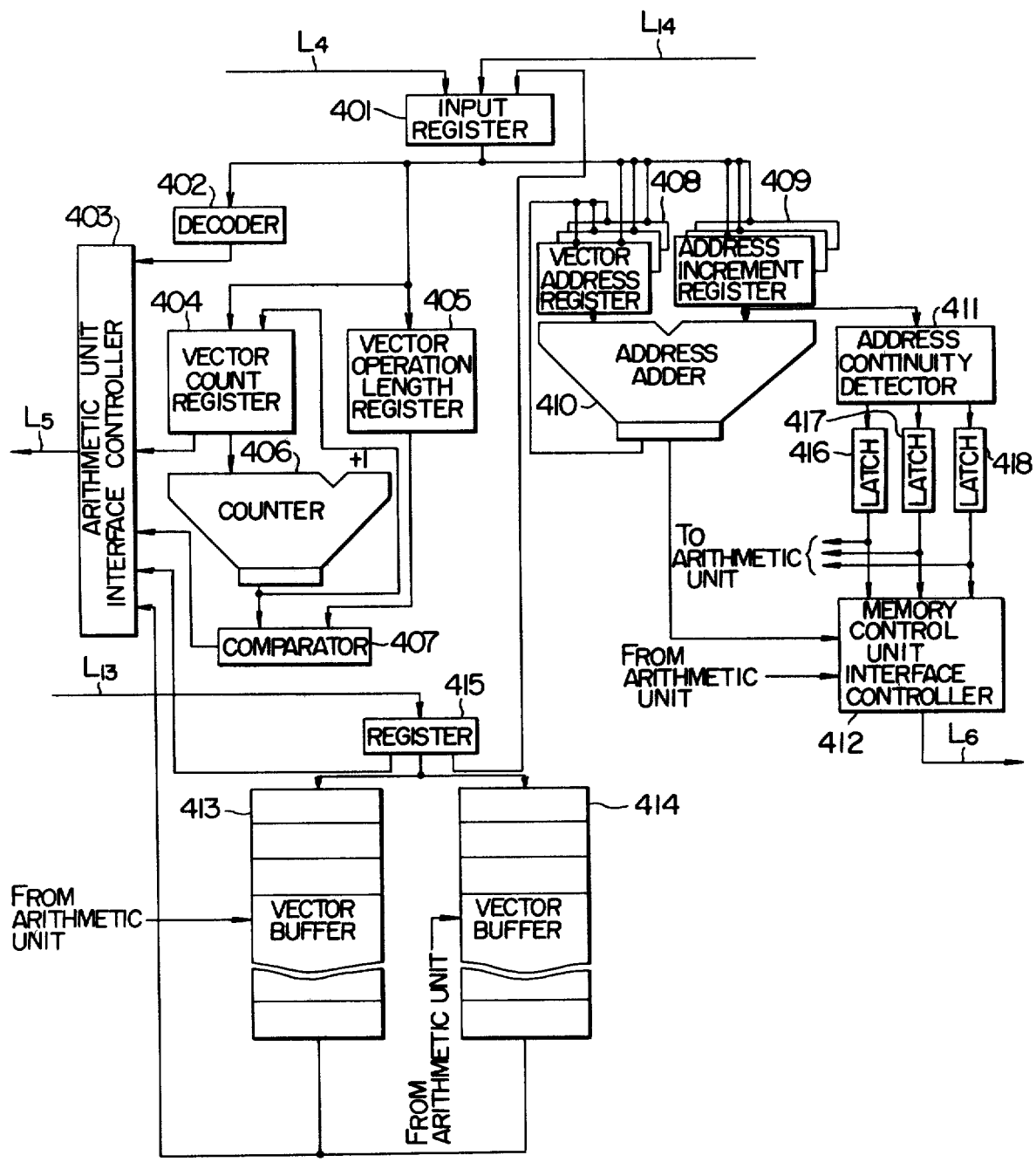
FIG. 4 shows in detailed block diagram the vector instruction control unit of FIG. 1.

FIG. 4 shows in block diagram an example of the vector instruction control unit 5 which is one of the essential components of this invention. The decoded information obtained through the decoding of a vector instruction by the instruction control unit 1 is sent through the line L4 to the vector instruction control unit 5 so as to be decoded in further detail. For the information delivered from the instruction control unit 1 is sent through an input register 401 to a decoder 402, the vector initial count is sent through the input register 401 to a vector count register 404, and the vector operation length is sent through the input register 401 to a vector operation length register 405. These values are used to count the number of vector operations and to control the completion of the vector operation. The address of an address vector is temporarily transferred from the input register 401 to a vector address register 408 and further sent through an address adder 410, a memory control unit interface controller 412 and a line L6 to the memory control unit 3 so as to make a memory request. The thus read out data, which is of an address vector as seen from FIG. 2, is transferred from the memory control unit 3 through a line L13 to a register 415. This data is split into the first, second and third operand vector table addresses and set in the respective vector address registers 408. These values are sent again through the address adder 401, the memory control unit interface controller 412 and the line L6 to the memory control unit 3 to make a memory request. The thus read out data, which is an operand vector table, is transferred from the memory control unit 3 through the line L13 to the register 415. The operand vector table includes an operand head vector address and an operand address increment value. The operand address increment value is sent from the register 415 to an arithmetic unit interface controller 403 and also transferred through the register 401 to a vector address increment register 409. On the other hand, the operand head vector address and the vector initial count set in the vector count register 404 are sent to the arithmetic unit interface controller 403. These three data, i.e. the operand address increment value, the operand vector address and the vector initial count are thereafter sent through a line L5 to the arithmetic unit 2.

The detail of the arithmetic unit 2 will not be described here, but the unit itself, like an arithmetic unit used in a well-known, large-capacity, general purpose digital computer, may comprise an adder, a shifter, a multiplier, a byte operator, a work register, etc. The arithmetic unit 2 performs the multiplication and addition for the data sent from the vector instruction control unit 5 and the result of the operations is sent back through a line L14 to the vector instruction control unit 5. The data sent back is set in the input register 401 and thereafter registered in the vector address register 408. Since there are the first, second and third operand vector table addresses, the above-described operation is repeated with respect to these operand vector tables.

The address increment registers 409 store the address increment values associated with the first, second and third operands. At the time when these values are set in the registers 409, if the increment values are detected to be 4 in the single-precision (1 word) arithmetic by an address continuity detector 411, the associated addresses are regarded as continuous while the detector 411 regards the associated addresses as continuous for the increment values of 8 in the double-precision (2 word) arithmetic. Then, latches 416, 417 and 418 are set for the first, second and third operands respectively.

The first, second and third operand addresses, stored in the vector address registers 408, are added to the contents of the vector address increment registers 409 and the result of the addition is sent as an operand request to the memory control unit 3 through the memory control unit interface controller 412 and the line L6. The detail of the memory control unit 3 will not be described here, but the unit 3, like a memory control unit used in a well-known large-capacity digital computer, may comprise an address translation mechanism, a high-speed small-capacity memory (buffer memory), etc.

An important point in this invention is that at the time when an operand request is sent from the vector instruction control unit 5 to the memory control unit 3, vector buffers 413 and 414 are used if the addresses are continuous (that is, if the latches 416 to 418 are set) while a buffer memory is used if the addresses are not continuous. Namely, in the case of the second operand being taken as an example, the latch 417 is indicative of whether the addresses are continuous or not. If the addresses are continuous, the data in the main memory 4 is transferred through the memory control unit 3 to the first vector buffer 413 and requests are continued until the first vector buffer 413 is filled. When the arithmetic unit 2 needs an operand, the unit 2 checks the latches 416 to 418. If the associated addresses are continuous, the arithmetic unit 2 delivers a read request to the first vector buffer 413 so that the content of the first vector buffer 413 is read out and sent back through the arithmetic unit interface controller 403 and the line L5 to the arithmetic unit 2. The example of FIG. 4 is shown as provided with the first and second vector buffers 413 and 414. Since the vector instruction used in the present embodiment is of three-operand type wherein two operands are used for fetching and the remaining one is used for storing, two vector buffers are to be used for fetching. These vector buffers are used for the prefetching of operand data and the contents of the vector buffers are read out, when required for arithmetic operation, and sent through the line L5 to the arithmetic unit 2. If the addresses are not continuous, the arithmetic unit 2 delivers to the memory control unit interface controller 412 a request to sent operand addresses to the memory control unit 3. When an operand is stored in the buffer memory, the operand is transferred from the buffer memory to the arithmetic unit 2. On the other hand, if no operand is stored in the buffer memory, an operand is transferred from the main memory 4 to the buffer memory which in turn sends the operand to the arithmetic unit 2. The main memory and the buffer memory may be regarded as one memory unit.

The vector initial count 107 shown in FIG. 2 is set in the vector count register 404 and the vector operation length 108 shown in FIG. 2 is set in the vector operation length register 405. Each time an operation is completed, the counter 406 adds +1 to the content of the vector count register 404 and the result of the addition is compared with the content of the vector operation length register 405 in a comparator 407. If a coincidence is detected by the comparator 407, a signal indicative of the completion of the operation is sent through the arithmetic unit interface controller 403 and the line L5 to the arithmetic unit 2. The output of the counter 406 is set in the vector count register 404 to renew the content thereof.

According to this invention, as described above, the processing of vector instructions in which vectors representing the locations of data are used as operands is possible by adding to a general purpose data processing apparatus a decoder for decoding codes which command the arithmetic operations of vector instructions and a means for controlling vector operands. Moreover, the speed of access to operands can be increased by previously fetching the operands by the vector buffers for exclusive use when the operands are continuous and by using the buffer memory (or main memory) when the operands are not continuous.

What is claimed is:
1. A data processing apparatus comprising:
   a memory means for storing instruction words and operands;
   an arithmetic means;
   first instruction control means, connected with said memory means and said arithmetic means, for decoding the instruction words read out of said memory means, and for controlling said arithmetic means when the decoded instructions are ones other than vector instructions, so that said arithmetic means performs operations according to the decoded instructions; and
   second instruction control means, connected with said first instruction control means and said arithmetic means, for controlling said arithmetic means when the instructions decoded in said first instruction control means are vector instructions, so that said arithmetic means performs vector operations according to the vector instructions.

2. A data processing apparatus as claimed in claim 1, wherein said second instruction control means includes:
   a commanding means for commanding said arithmetic means to perform the vector operations according to said vector instructions from said first instruction control means; and
   vector operand control means for controlling the reading of the operands for said vector operations in accordance with the vector instructions from said first instruction control means and for controlling the number of said vector operations.

3. A data processing apparatus as claimed in claim 2, wherein said vector operand control means includes:
   means for requesting of said memory means the reading of operands for said vector operations in accordance with the vector instructions from said first instruction control means;
   means for controlling the number of said vector operations;
   vector buffer means;
   detecting means for detecting the continuity or discontinuity of the operands of said memory means on the basis of said vector instructions; and
   means, responsive to the detection of the continuity by said detecting means, for causing said vector buffer means to store therein the operands from said memory means prior to the vector operations so that said arithmetic means uses the operands out of said vector buffer means.

4. A data processing apparatus as claimed in claim 1, wherein said second instruction control means includes:
means for commanding said arithmetic means to perform the vector operations according to said vector instructions from said first instruction control means;
counting means for counting the number of the vector operations each time said arithmetic means completes one vector operation and for indicating the completion of the vector operation to said arithmetic means;
vector buffer means;
means for storing addresses in said memory means of the operands and increment values thereof which are provided from said vector instructions for the vector operations;
means, responsive to said addresses and said increment values thereof, for requesting of said memory means the reading of the operands;
detecting means for detecting the continuity or discontinuity of the operands on the basis of said increment values; and
means, responsive to the detection of the continuity by said detecting means, for causing said vector buffer means to store therein the operands from said memory means prior to the vector operations, so that said arithmetic means uses the operands out of said vector buffer means.

5. A data processing apparatus comprising:
memory means for storing instruction words including a first field indicative of instruction codes, a second field and a third field, and operands;
an arithmetic means;
first instruction control means, connected with said memory means and said arithmetic means, for controlling said arithmetic means when the instruction words indicate instructions other than vector instructions, in accordance with those instructions, said first instruction control means including
an instruction register in which said instruction words read out of said memory means are set,
a decoding means which decodes said instruction codes of said first field of said instruction words in said instruction register, and
means, responsive to said decoding means indicating vector instructions, for generating information for vector operands from said second field of said instruction words and vector command codes from said third field of said instruction words in said instruction register; and
second instruction control means, connected with said first instruction control means and said arithmetic means, said second instruction control means including
decoding means which decodes said vector command codes from said first instruction control means and commands said arithmetic means to perform vector operations according to said vector command codes, and
vector operand control means which controls the reading of operands for said vector operations in accordance with the information for vector operands from said first instruction control means and controls the number of said vector operations.

6. A data processing apparatus as claimed in claim 5, wherein said vector operand control means includes:
means for requesting of said memory means the reading of operands for said vector operations in accordance with said information for vector operands from said first instruction control means;
means for controlling the number of said vector operations;
vector buffer means;
detecting means for detecting the continuity or discontinuity of the operands on said memory means on basis of said information for vector operand; and
means, responsive to the detection of the continuity by said detecting means, for causing said vector buffer means to store therein the operands from said memory means prior to the vector operations, so that said arithmetic means uses the operands out of said vector buffer means.

7. A data processing apparatus as claimed in claim 5, wherein said vector operands control means includes:
means for determining a vector operation length, the addresses of said memory means of the operands and the increment values thereof on the basis of said information from said first instruction control means;
means for counting the number of the vector operations each time said arithmetic means completes one vector operation and for indicating the completion of the vector operation to said arithmetic means when the number of vector operations corresponding to said vector operation length have been carried out;
vector buffer means;
means, responsive to said addresses, for requesting of said memory means the reading of the operands, and updating said addresses in accordance with said increment values;
detecting means for detecting the continuity or discontinuity of the operands on basis of said increment values; and
means, responsive to the detection of the continuity by said detecting means, for causing said vector buffer means to store therein the operands indicated by said addresses prior to the vector operations, so that said arithmetic means uses the operands.

8. A data processing apparatus comprising:
memory means for storing instruction words including a first field indicative of instruction codes, a second field, a third field, and a fourth field, and operands;
an arithmetic means;
first instruction control means, connected with said memory means and said arithmetic means, for controlling said arithmetic means when the instruction words indicate instructions other than vector instructions, in accordance with those instructions, said first instruction control means including
an instruction register in which said instruction words read out of said memory means are set,
a general purpose register means which has a plurality of general purpose registers,
decoding means which decodes said instruction codes of said first field of said instruction words in said instruction register, and
means, responsive to said decoding means indicating vector instructions, for generating a vector operation length and information for vector operands from one of said plural general purpose registers indicated by said second field of said instruction words, and for generating vector command codes from the contents of one of said plural general purpose registers indicated by said third field of said instruction words and the contents of said fourth field thereof; and second instruction control means, connected with said first instruction control means and said arithmetic means, said second instruction control means including decoding means which decodes said vector command codes from said first instruction control means and commands said arithmetic means to perform vector operations according to said vector command codes, and vector operand control means which controls the reading of operands in accordance with said information from said first instruction control means and controls the number of said vector operations in accordance with the vector operation length from said first instruction control means.

9. A data processing apparatus as claimed in claim 8, wherein said vector operand control means includes:

means for requesting of said memory means the reading of operands for said vector operations in accordance with said information from said first instruction control means;

means for controlling the number of said vector operations;

vector buffer means;

detecting means for detecting the continuity or discontinuity of the operands on said memory means on basis of said information for vector operands; and means, responsive to the detection of the continuity by said detecting means, for causing said vector buffer means to store therein the operands from said memory means prior to the vector operations, so that said arithmetic means uses the operands out of said vector buffer means.

10. A data processing apparatus as claimed in claim 8, wherein said vector operand control means includes:

means for determining the addresses on said memory means of the operands and the increment values thereof on the basis of said information from said first instruction control means;

means for counting the number of the vector operations each time said arithmetic means completes one vector operation and for indicating the completion of the vector operation to said arithmetic means when the number of vector operations corresponding to said vector operation length have been carried out;

vector buffer means;

means, responsive to said addresses, for requesting of said memory means the reading of the operands and updating said addresses in accordance with said increment values;

detecting means for detecting the continuity or discontinuity of the operands on basis of said increment values; and means, responsive to the detection of the continuity by said detecting means, for causing said vector buffer means to store therein the operands indicated by said addresses prior to the vector operations, so that said arithmetic means uses the operands.

11. A data processing apparatus comprising:

memory means for storing instruction words and operands;

an arithmetic means;

first instruction control means, connected with said memory means and said arithmetic means, said first instruction control means including decoding means which decodes the instruction words read out of said memory means, and means, responsive to the decoded instructions being ones other than vector instructions, for controlling said arithmetic means, so that said arithmetic means performs operations according to the decoded instructions; and second instruction control means, connected with said first instruction control means and said arithmetic means, said second instruction arithmetic means including commanding means which commands said arithmetic means to perform the vector operations according to said vector instructions from said first instruction control means, and vector operand control means which controls the reading of operands for said vector operations in accordance with the vector instructions from said first instruction control means and controls the number of said vector operations.

12. A data processing apparatus as claimed in claim 11, wherein said vector operand control means includes:

means for requesting of said memory means the reading of operands for said vector operations in accordance with the vector instructions from said first instruction control means;

means for controlling the number of said vector operations;

vector buffer means;

detecting means for detecting the continuity or discontinuity of the operands on said memory means on the basis of said vector instructions; and means, responsive to the detection of the continuity by said detecting means, for causing said vector buffer means to store therein the operands from said memory means prior to the vector operations, so that said arithmetic means uses the operands out of said vector buffer means.

13. A data processing apparatus as claimed in claim 11, wherein said vector operand control means includes:

commanding means for commanding said arithmetic means to perform the vector operations according to said vector instructions from said first instruction control means;

counting means for counting the number of the vector operations each time said arithmetic means completes one vector operation and for indicating the completion of the vector operation to said arithmetic means;

vector buffer means;

means for storing addresses in said memory means of the operands and increment values thereof which are provided from said vector instructions for the vector operations;

means, responsive to said addresses and said increment values thereof, for requesting of said memory means the reading of the operands;

detecting means for detecting the continuity or discontinuity of the operands on the basis of said increment values; and means, responsive to the detection of the continuity by said detecting means, for causing said vector buffer means to store therein the operands from said memory means prior to the vector operations so that said arithmetic means uses the operands out of said vector buffer means.

* * * * *